(12) United States Patent
Kim et al.

(10) Patent No.: US 9,220,015 B2
(45) Date of Patent: Dec. 22, 2015

(54) METHOD AND APPARATUS FOR RECEIVING AVAILABLE CHANNEL INFORMATION IN A WIRELESS LAN SYSTEM

(75) Inventors: Eun Sun Kim, Gyeonggi-do (KR); Byoung Hoon Kim, Gyeonggi-do (KR); Yong Ho Seok, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 533 days.

(21) Appl. No.: 13/637,531

(22) PCT Filed: Mar. 31, 2011

(86) PCT No.: PCT/KR2011/002240
§ 371 (c)(1),
(2), (4) Date: Dec. 10, 2012

(87) PCT Pub. No.: WO2011/122884
PCT Pub. Date: Oct. 6, 2011

(65) Prior Publication Data
US 2013/0201928 A1    Aug. 8, 2013

Related U.S. Application Data

(60) Provisional application No. 61/326,668, filed on Apr. 22, 2010, provisional application No. 61/321,506, filed on Apr. 7, 2010, provisional application No. 61/319,883, filed on Apr. 1, 2010, provisional application No. 61/319,267, filed on Mar. 31, 2010.

(51) Int. Cl.
*H04W 16/14*      (2009.01)
*H04W 48/08*      (2009.01)

(52) U.S. Cl.
CPC .............. *H04W 16/14* (2013.01); *H04W 48/08* (2013.01)

(58) Field of Classification Search
CPC ..................................................... H04W 16/14
USPC ............................................. 455/509, 180.2
See application file for complete search history.

(56) References Cited

U.S. PATENT DOCUMENTS

| 2009/0014934 A1* | 1/2009 | Seber .......................... 269/207 |
| 2010/0048234 A1 | 2/2010 | Singh |
| 2010/0309317 A1* | 12/2010 | Wu et al. ....................... 348/180 |
| 2011/0096770 A1* | 4/2011 | Henry .......................... 370/352 |
| 2011/0122855 A1* | 5/2011 | Henry .......................... 370/338 |

OTHER PUBLICATIONS

Written Opinion and International Search Report issued in corresponding International Patent Application No. PCT/KR2011/002240 dated Nov. 22, 2011.

(Continued)

*Primary Examiner* — Shaq Taha
(74) *Attorney, Agent, or Firm* — Morgan, Lewis & Bockius LLP (57) ABSTRACT

The present invention relates to a method and apparatus for receiving a white space map in a wireless LAN system. According to one aspect of the present invention, in a method in which a first station (STA) receives a white space map in a wireless LAN system, wherein the first station operates as an unlicensed device that is allowed to operate in an available channel not used by a licensed device in a white space band, the first station receives, from a second station, a frame including the white space map which includes a black list and a first field for indicating that the white space map contains the black list, and operates in at least one channel from the rest of the channels in TVWS, excluding the channel contained in the black list, wherein the black list is a list of channels which cannot be used by the unlicensed device.

18 Claims, 9 Drawing Sheets

(56) References Cited

OTHER PUBLICATIONS

LG Electronics, "Amendment Proposal for TV White Spaces Operation," IEEE 802.11, TGaf, IEEE 802.11-10/0263r1 (Mar. 18, 2010).

NICT, "Enabling Procedure of Communication in TVWS under FCC rules," IEEE 802.11, TGaf, IEEE 802.11-10/0261/1 (Feb. 28, 2009).

ECMA International, "MAC and PHY for Operation in TV White Space," Final Draft Standard EDMA-XXX 1st Edition, Ecma/TC48/2009/061 (Oct. 2009).

* cited by examiner

| Element ID | Length | Country String | First Channel Number /Regulatory Extension Identifier | Number of Channels /Regulatory Class | Maximum Transmit Power Level /Coverage Class | Pad (if needed) |
|---|---|---|---|---|---|---|
| 1 | 1 | 3 | 1 | 1 | 1 | 0 or 1 |

These three fields are repeated, as determined by the Length field

Octets :

FIG. 6

| Element ID | Length | Capabilities |
|---|---|---|

Octets :  1  1  n

FIG. 7

| Element ID | Length | Number of Channels | Channel Map |
|---|---|---|---|

Octets :  1  1  1  n

METHOD AND APPARATUS FOR RECEIVING AVAILABLE CHANNEL INFORMATION IN A WIRELESS LAN SYSTEM

TECHNICAL FIELD

The present invention relates to a wireless LAN system and more particularly to a method and apparatus for receiving multi-band information in a wireless LAN system.

BACKGROUND ART

A standard of a wireless local area network (WLAN) technology is being developed as a standard of Institute of Electrical and Electronics Engineers (IEEE) 802.11. IEEE 802.11a and IEEE 802.11b use an unlicensed band at 2.4 GHz or 5 GHz and IEEE 802.11b provides a transfer rate of 11 Mbps and IEEE 802.11a provides a transfer rate of 54 Mbps. IEEE 802.11g applies Orthogonal Frequency Division Multiplexing (OFDM) at 2.4 GHz to provide a transfer rate of 54 Mbps. IEEE 802.11n applies multiple input multiple output-OFDM (MIMO-OFDM) to provide a transfer rate of 300 Mbps for 4 spatial streams. IEEE 802.11n supports a channel bandwidth of up to 40 MHz. In this case, IEEE 802.11n provides a transfer rate of 600 Mbps.

An IEEE 802.11af standard for defining operation of an unlicensed device in a TV whitespace (TVWS) band is currently being developed.

The TVWS band, which is a frequency band allocated to a broadcast TV, includes an Ultra High Frequency (UHF) band and a Very High Frequency (VHF) band. Specifically, the TVWS band is a frequency band which is allowed to be used by an unlicensed device under a condition that this does not hinder communication of a licensed device that operates in the frequency band. The licensed device may include a TV or a wireless microphone. The licensed device may be referred to as an incumbent user or a primary user. To overcome the problem of coexistence of unlicensed devices, a signaling protocol such as a common beacon frame, a frequency mechanism, or the like may be required for the unlicensed devices.

Operations of all unlicensed devices are permitted in a band of 512-608 MHz and a band of 614-698 MHz. However, only communication between fixed devices is permitted in bands of 54-60 MHz, 76-88 MHz, 174-216 MHz, and 470-512 MHz. The term "fixed device" refers to a device that performs signal transmission only at a fixed location. An IEEE 802.11 TVWS terminal is an unlicensed device that operates, in the TVWS spectrum, using an IEEE 802.11 media access control (MAC) layer and a physical (PHY) layer.

An unlicensed device that desires to use the TVWS band should provide a function to protect licensed devices. Accordingly, the unlicensed device should check whether or not a licensed device occupies the band before the unlicensed device starts signal transmission.

To accomplish this, the unlicensed device may check whether or not the band is being used by a licensed device by performing spectrum sensing. Examples of the spectrum sensing mechanism include an energy detection scheme and a feature detection scheme. The unlicensed device may determine that a licensed device is using a specific band when the intensity of a received signal is greater than a specific level or when a DTV preamble is detected. Upon determining that a licensed device is operating in a channel that is immediately adjacent to a channel currently used by the unlicensed device, the unlicensed device should reduce transmission power.

In the spectrum sensing mechanism, power consumption of a station (STA) is relatively high since the sensing duration is a relatively long period greater than 10 ms. Particularly, the sensing duration is proportional to the possibility of detection of a licensed device signal and therefore the possibility of detection of a licensed device signal increases as the sensing duration increases. Accordingly, there is a need to provide an efficient scanning mechanism that can reduce power consumption of the STA.

DISCLOSURE

Technical Problem

There is a problem in that power consumption is increased if an STA which operates as an unlicensed device in the TVWS depends only on frequency sensing to acquire available channel information as described above.

It is an object of the present invention to provide a method for receiving a whitespace map, which allows an STA which operates as an unlicensed device in the TVWS to efficiently acquire available channel information.

Objects of the present invention are not limited to those described above and other objects will be clearly understood by a person having ordinary knowledge in the art from the following description.

Technical Solution

In a method for receiving a whitespace map by a first station (STA) that operates as an unlicensed device that is allowed to operate in an available channel that is not being used by a licensed device in a whitespace band in a wireless LAN system according to an aspect of the present invention to achieve the above objects, the first station receives a frame including a whitespace map including a black list and a first field indicating that the whitespace map includes the black list from a second station and operates in at least one channel, other than channels included in the black list, from among channels included in the whitespace map, wherein the black list is a list of channels which cannot be used by an unlicensed device.

Here, the first station may perform spectrum sensing, update the whitespace map according to a result of the spectrum sensing, and transmit information regarding the updated whitespace map to the second station.

The information regarding the updated whitespace map may be a list of channels which can be used by an unlicensed device since it has been confirmed through the spectrum sensing that the channels are not used by a licensed device from among the channels included in the black list.

The black list may be expressed in bitmap form.

The first station may scan channels other than the channels included in the black list from among the channels included in the whitespace map.

When the frame includes a white list, the first field may indicate maximum transmit powers of channels included in the white list and the white list may be a list of channels which can be used by an unlicensed device.

The first field may indicate that the frame includes the black list when the first field is set to a predefined specific value.

The frame may further include a second field indicating that the frame includes the whitespace map.

The first station may receive an information element including a bit indicating that the frame includes the whitespace map from the second station.

The information element may be an extended capabilities information element.

A first station (STA) that operates as an unlicensed device that is allowed to operate in an available channel that is not being used by a licensed device in a whitespace band in a wireless LAN system according to another aspect of the present invention to achieve the above objects includes a reception module for receiving a frame including a whitespace map including a black list and a first field indicating that the whitespace map includes the black list from a second station and a processor for operating in at least one channel, other than channels included in the black list, from among channels included in the whitespace map, wherein the black list is a list of channels which cannot be used by an unlicensed device.

Advantageous Effects

According to embodiments of the present invention, the station (STA) can efficiently acquire information regarding available channels.

BEST MODE

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or shown in block diagram form, focusing on important features of the structures and devices, so as not to obscure the concept of the present invention. The same reference numbers will be used throughout this specification to refer to the same or like parts.

First, a general configuration of a wireless LAN system is described below with reference to FIGS. 1 and 2.

Figure 1:
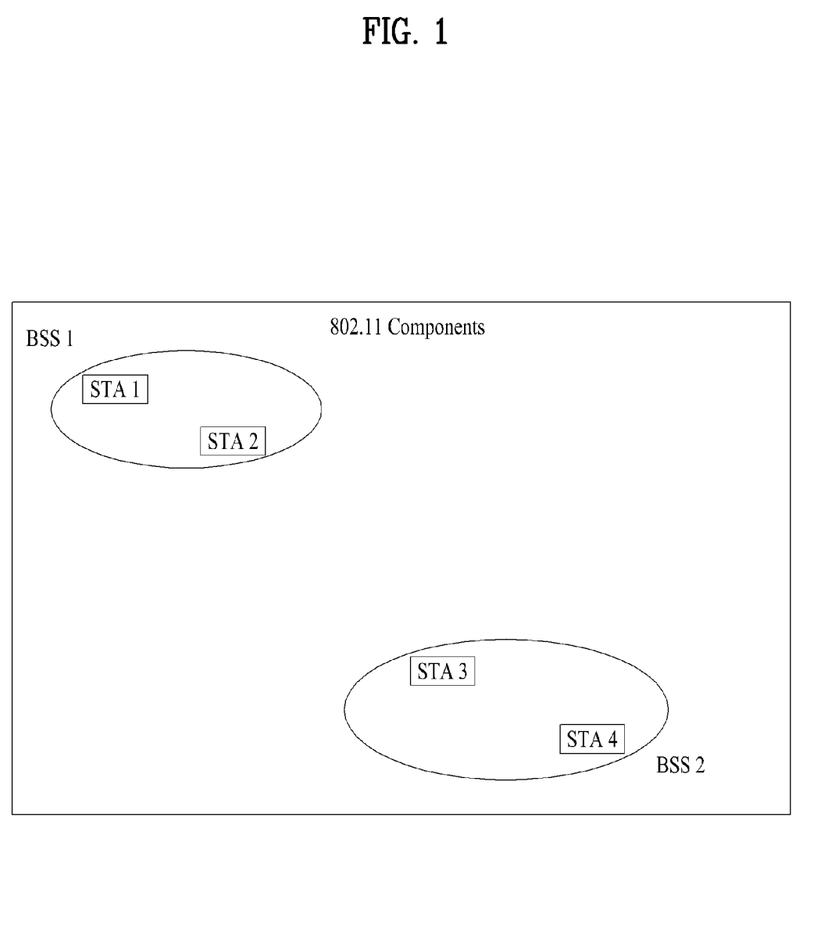
FIG. 1 illustrates an exemplary configuration of a wireless LAN system.

FIG. 1 illustrates an exemplary configuration of a wireless LAN system.

As shown in FIG. 1, the wireless LAN system includes one or more Basic Service Sets (BSSs). A BSS is a set of Stations (STAB) which can communicate with each other after successfully achieving synchronization.

The STA is a logical entity that includes an interface for a physical layer of a wireless medium and a Medium Access Control (MAC) layer. STAB include access point (AP) and non-AP stations. Among STAB, a mobile terminal that is operated by a user may be a non-AP STA. When the term "STA" is stated, it may refer to a non-AP STA. The non-AP STA may also be referred to as another term such as a terminal, a Wireless Transmit/Receive Unit (WTRU), a User Equipment (UE), a Mobile Station (MS), a mobile terminal, or a mobile subscriber unit.

The AP is an entity that provides an associated station (STA), which is coupled to the AP, with a connection to a Distribution System (DS) through a wireless medium. The AP may also be referred to as a concentrated controller, a Base Station (BS), a Node-B, a Base Transceiver System (BTS), or a site controller.

The BSS may be classified into an infrastructure BSS and an independent BSS (IBSS).

Each BSS shown in FIG. 1 is an IBSS. The IBSS is a BSS that does not include an AP. Since the IBSS does not include an AP, the IBSS is not allowed to connect to a DS and thus forms a self-contained network.

Figure 2:
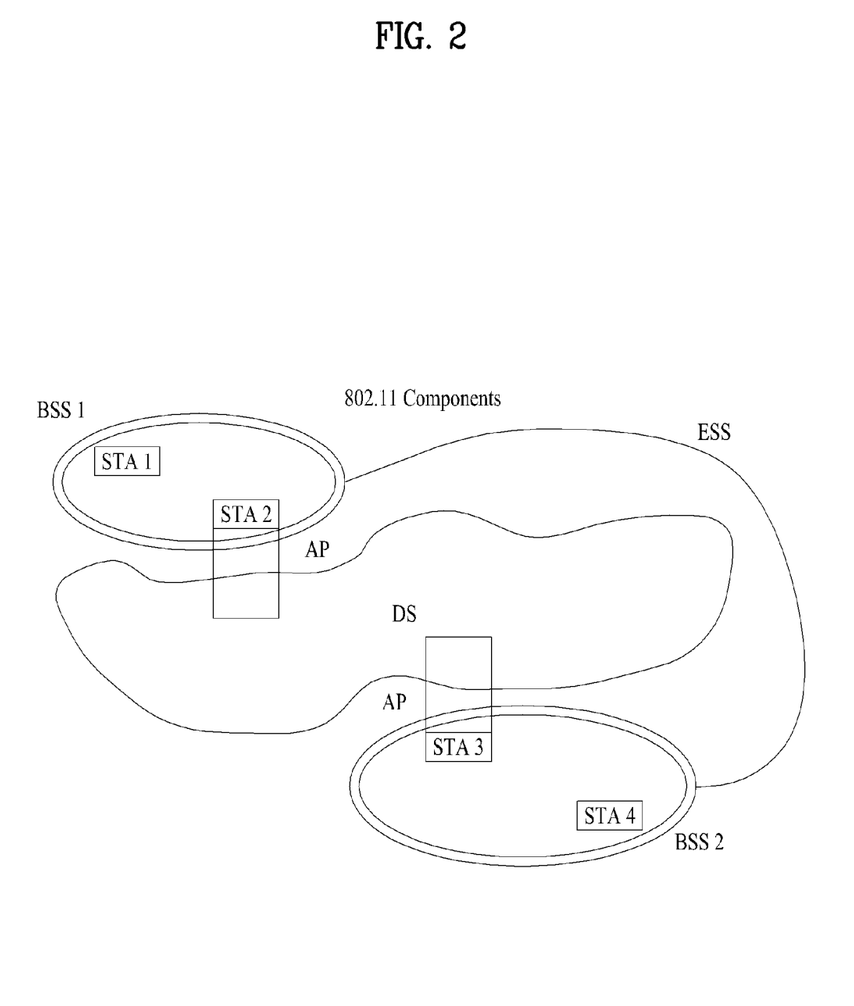
FIG. 2 illustrates another exemplary configuration of the wireless LAN system.

FIG. 2 illustrates another exemplary configuration of the wireless LAN system.

Each BSS shown in FIG. 2 is an infrastructure BSS. The infrastructure BSS includes one or more STAB and an AP. In the infrastructure BSS, in principle, communication between non-AP STAB is performed via an AP. However, when a direct link has been established between non-AP STAB, direction communication can be performed between the non-AP STAB.

As shown in FIG. 2, a plurality of infrastructure BSSs can be connected to each other through a DS. A plurality of BSSs connected through a DS is referred to as an Extended Service Set (ESS). STAB included in the ESs can communicate with each other. In the same ESS, a non-AP STA can move from one BSS to another BSS while performing seamless communication.

The DS is a mechanism which connects a plurality of APs. The DS is not necessarily a network and there is no limitation to the form of the DS provided that the DS can provide a specific distribution service. For example, the DS may be a wireless network such as a mesh network and may also be a physical structure that connects APs to each other.

To allow an STA to operate in the TV whitespace (TVWS) spectrum, first, there is a need to provide a protection scheme for licensed devices (or incumbent users). A channel, which can be used by an unlicensed device since the channel is not used by any licensed device, is referred to as an available channel. The most basic methods for an STA or AP to determine availability of a TV channel include a spectrum sensing method and a method of connecting to a database (DB) to acquire a TV channel. Information of the DB includes information regarding, for example, a schedule for use of a specific channel by a licensed device at a specific location. Accordingly, when an STA or AP desires to determine availability of a TV channel, the STA or AP needs to connect to the DB through the Internet to acquire DB information based on location information of the STA or AP.

To connect to a network, the STA needs to search for any network in which the STA can participate. The STA needs to identify a compatible wireless network before participating in the network. A procedure for identifying a network present in a specific region is referred to as scanning.

Such scanning is classified into active scanning and passive scanning.

Figure 3:
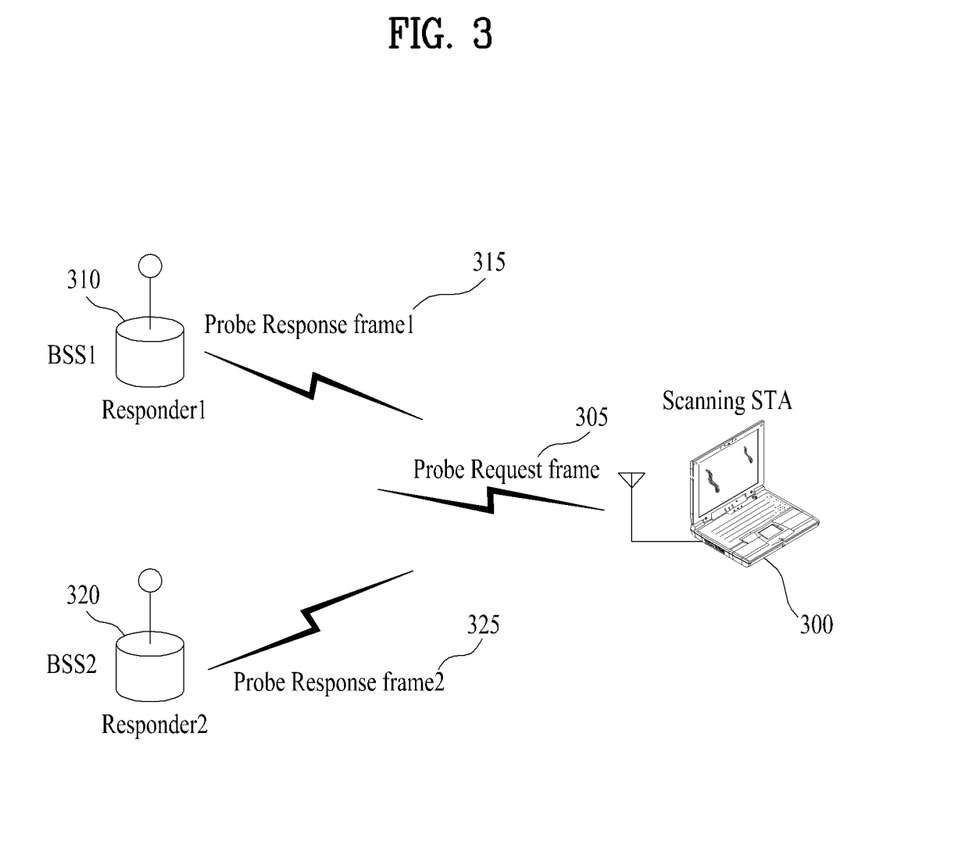
FIG. 3 schematically illustrates active scanning.

FIG. 3 schematically illustrates active scanning.

When an STA performs scanning using the active scanning scheme, the STA transmits a probe request frame in order to search for an AP around the STA while switching between channels and then awaits a response to the probe request frame. The responder transmits a probe response frame to the STA in response to the probe request frame transmitted from the STA. Here, the responder is an STA which has last transmitted a beacon frame in a BSS of a channel which is being scanned. In the infrastructure BSS, an AP serves as the responder since the AP transmits a beacon frame and, in the IBSS, the responder is not fixed since STAB in the IBSS take turns transmitting a beacon frame.

Referring to FIG. 3, when a scanning STA 300 transmits a probe request frame 305, responder 1 (310) of BSS1 and responder 2 (320) of BSS2, which have received the probe request frame, transmit probe response frame 1 (315) and probe response frame 2 (325) to the scanning STA 300. Upon receiving the probe response frame, the scanning STA 300 stores BSS related information included in the received probe response frame and shifts to a next channel and performs scanning of the next channel using the same method.

Figure 4:
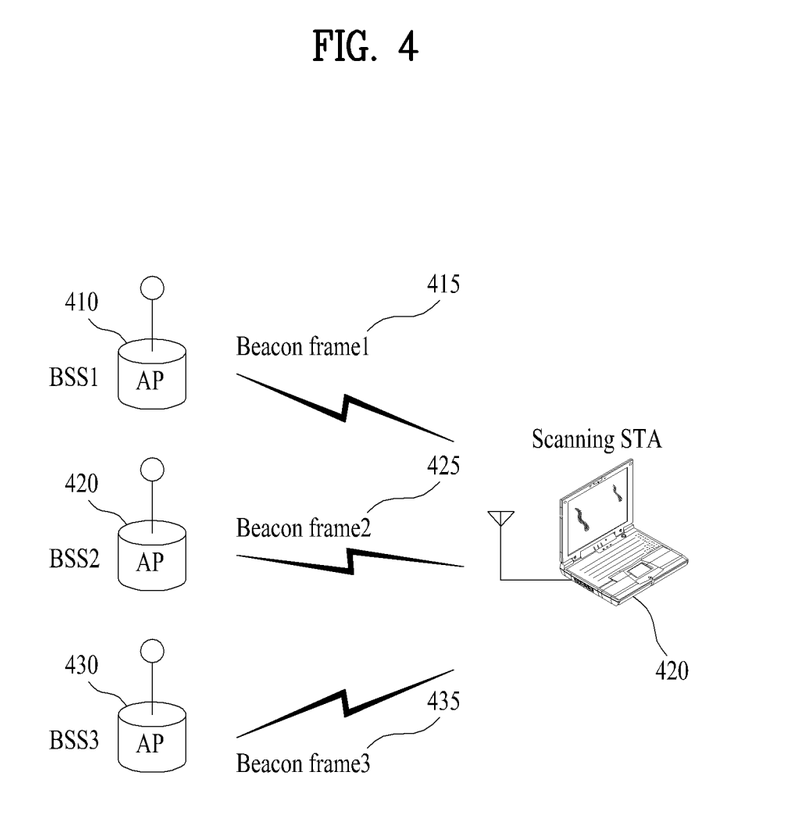
FIG. 4 schematically illustrates passive scanning.

FIG. 4 schematically illustrates passive scanning.

When an STA performs scanning using the passive scanning scheme, the STA awaits a beacon frame while switching between channels. The beacon frame, which is one of the management frames in IEEE 802.11, indicates presence of a wireless network and is transmitted at regular intervals to allow an STA which performs scanning to locate a wireless network to participate in the wireless network. In the infrastructure BSS, the AP serves to transmit the beacon frame at regular intervals.

When the STA that performs scanning has received a beacon frame, the STA stores BSS related information in the beacon frame and records beacon frame information in each channel while switching between channels.

In the example of FIG. 4, when a scanning STA 500, which is performing scanning using the passive scanning scheme, has received beacon frame 1 (415) transmitted by AP1 (410) of BSS1 and beacon frame 2 (425) transmitted by AP2 of BSS2 and has not received beacon frame 3 (435) transmitted by AP3 (430) of BSS3, the scanning STA 500 stores information indicating that the two BSSs (BSS1 and BSS2) have been found in the measurement channel and shifts to another channel.

Compared to passive scanning, active scanning has an advantage in that delay and power consumption are low.

A spectrum which is not used by licensed devices is referred to as a whitespace. The whitespace spectrum can be used by unlicensed devices. To allow an STA to operate in the whitespace spectrum, first, there is a need to provide a protection scheme for licensed devices (or incumbent users). The TVWS band, which is a frequency band allocated to a broadcast TV, includes an Ultra High Frequency (UHF) band and a Very High Frequency (VHF) band. Specifically, the TVWS band is a frequency band which is allowed to be used by an unlicensed device under a condition that this does not hinder communication of a licensed device that operates in the frequency band.

Although embodiments of the present invention are described with reference to a TVWS band as an example, the present invention is not limited to the TVWS band and may also be applied to any case in which an STA operates in a whitespace band.

A TV channel bandwidth in the TVWS is 6 MHz. While the channel bandwidth at 2.4 GHz or 5 GHz is 20 MHz, the TV channel bandwidth of the TVWS is 6 MHz. Therefore, the total number of channels that each STA needs to scan is greater than that of 2.4 GHz or 5 GHz. Accordingly, in the TVWS, there is a problem in that overhead due to sensing is very high if the STA performs sensing on all channels in the scanning procedure.

Thus, in the TVWS, it is possible to reduce scanning overhead if the STA receives data indicating whether or not each TV channel is occupied by a licensed device signal from the enabling STA or AP. In the TVWS, the data indicating whether or not each TV channel is occupied by a licensed device signal is referred to as a whitespace map. The whitespace map may include information regarding channels in which no licensed device signal is transmitted and a transmit power level of each of the channels in which no licensed device signal is transmitted. The whitespace map may include information regarding channels in which a licensed device signal is transmitted.

Information included in the whitespace map is received from a DB. A channel unit included in the whitespace map may be the minimum unit configured in the DB. Although it is assumed in the embodiments of the present invention that the minimum unit configured in the DB is 6 MHz, the minimum unit may also be 7 MHz, 8 MHz, or 1 MHz. The channel unit included in the whitespace map may differ from a channel unit operating in the wireless LAN system. For example, a channel included in the whitespace map may be 6 MHz and a channel operating in the wireless LAN system may be 20 MHz. The following is a description of a method for receiving a whitespace map according to an embodiment of the present invention.

The whitespace map according to an embodiment of the present invention includes a field indicating whether the whitespace map includes a white list or a black list and includes the white list or the black list according to the field. The white list is a list of channels that can be used by an unlicensed device since the channels are not used by any licensed device. Channels which can be used by an unlicensed device since the channels are not used by a licensed device signal are referred to as available channels. The black list is a list of channels that cannot be used by an unlicensed device since the channels are being used by licensed devices.

First, a whitespace map according to a first embodiment of the present invention is described below with reference to FIG. 5.

The first embodiment of the present invention suggests a method of transmitting a whitespace map using a country information element defined in the existing standard. The country information element has been introduced to satisfy a rule that the transmit power level of a specific band differs for each sub-band. The country information element has then been extended to reflect the rules of each country.

Country information element indicating channels which are based on the operating frequencies and locations (countries) of APs and STAB are defined in the IEEE 802.11 WLAN standard. FIG. 5 illustrates a country information element. The country information element is transmitted within a beacon frame or a probe response frame.

Figure 5:
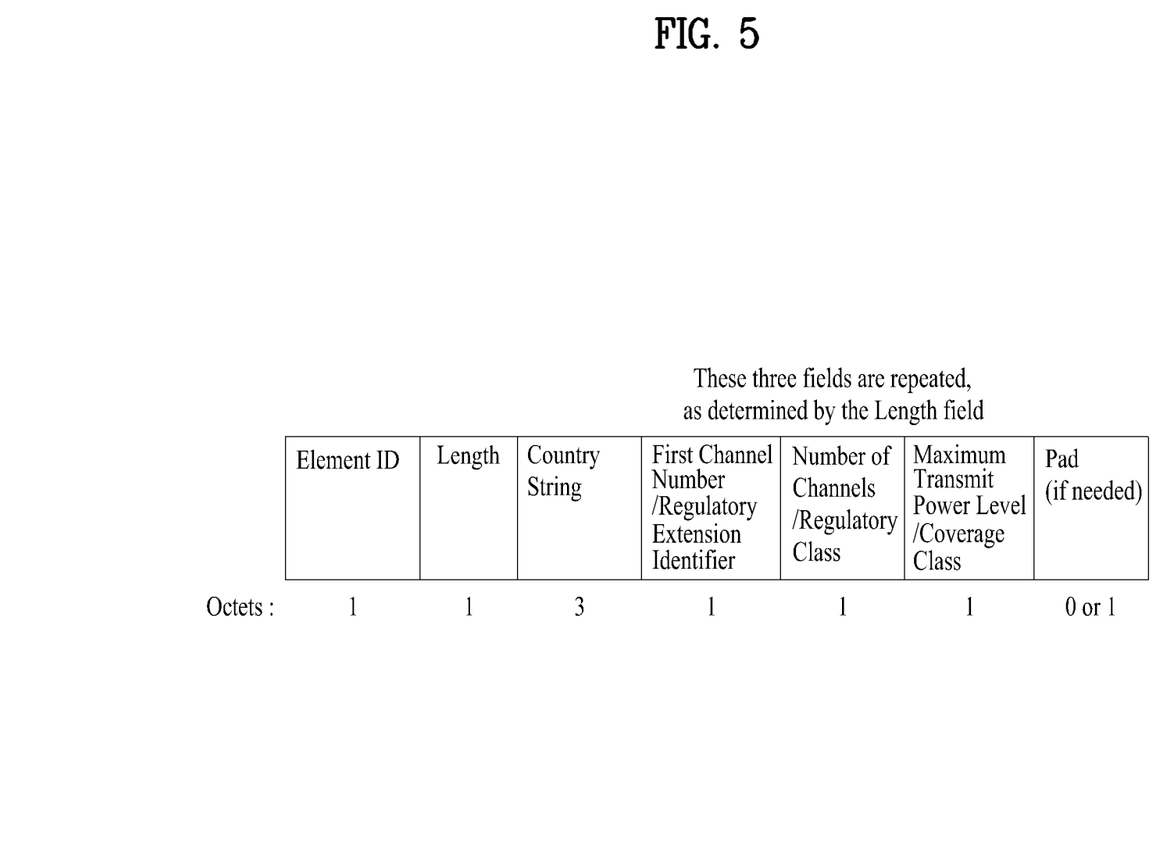

As shown in FIG. 5, the country information element includes a First Channel Number field, a Number of Channels field, and a Maximum Transmit Power Level field. The First Channel Number field indicates a first channel number of a sub-band indicated by the country information element and the First Channel Number field and the Number of Channels field indicate, in combination, a set of channels in which the AP operates. The Maximum Transmit Power Level field indicates a maximum transmit power of a set of channels indicated by the First Channel Number field and the Number of Channels field.

The First Channel Number field, the Number of Channels field, and the Maximum Transmit Power Level field are defined as a sub-band triplet that indicates information regarding the sub-band and a plurality of sub-band triplets may be included in the country information element. That is, a sub-band transmits information regarding a channel in which the corresponding AP can operate.

As shown in FIG. 5, the First Channel Number field, the Number of Channels field, and the Maximum Transmit Power Level field may indicate respective values of a regulatory extension identifier, a regulatory class, and a coverage class. In this case, the First Channel Number field, the Number of Channels field, and the Maximum Transmit Power Level field are defined as a set of regulatory triplets. A regulatory triplet may be followed by a sub-band triplet.

In the case in which the regulatory class of the country information element is set to a value corresponding to the TVWS as a method of transmitting the whitespace map using the country information element, the sub-band triplet which follows the regulatory class may be defined to indicate the white list or the black list. When the STA has received the whitespace map through the country information element, the STA performs scanning using the white list or the black list included in the country information element. That is, the STA scans only channels included in the white list when the country information element includes the white list and scans channels other than the channels included in the black list when the country information element includes the black list.

Here, information indicating whether the channel list indicated by the sub-band triplet of the country information element is a white list or a black list needs to be provided. Accordingly, when the Maximum Transmit Power Level field is set to a predefined specific value (for example, 0 or infinite), this may be defined to indicate that the channel list indicated by the sub-band triplet of the country information element is a black list. That is, when the sub-band triplet of the country information element includes a white list, the Maximum Transmit Power Level field may indicate the maximum transmit power levels of channels indicated by the sub-band triplet of the country information element and, when the sub-band triplet of the country information element includes a black list, the Maximum Transmit Power Level field may be set to the specific value such as 0 or infinite to indicate that the channel list indicated by the sub-band triplet of the country information element is the black list.

When the STA has received the country information element, the STA determines that the channel list indicated by the sub-band triplet of the country information element is a black list when the Maximum Transmit Power Level field is set to the predefined specific value and then performs scanning on channels other than channels included in the channel list indicated by the sub-band triplet.

Figure 6:
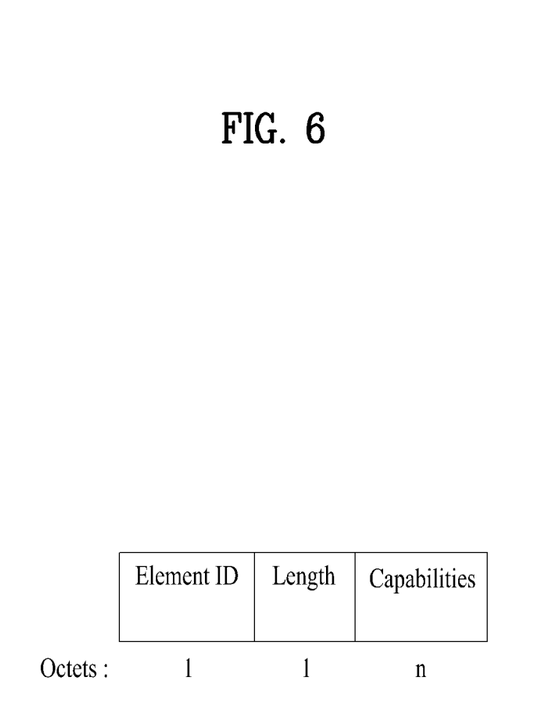
FIG. 6 illustrates an extended capabilities information element.

As another method of transmitting the whitespace map using the country information element, the present invention suggests a method of transmitting the whitespace map using an extended capabilities information element. FIG. 6 illustrates the extended capabilities information element.

A whitespace map service bit may be defined in a capabilities field of the extended capabilities information element and the whitespace map service bit may be set to a predefined value to indicate that the country information element includes a black list or a white list. That is, when a whitespace map service bit of a capabilities field of a received extended capabilities information element is set to the predefined value, the STA determines that the country information element includes a black list or a white list.

A whitespace map service bit is added to the capabilities field of the extended capabilities information element and, when the whitespace map service bit is true (for example, 1), a sub-band triplet that follows the regulatory triplet indicates a white list or a black list. When the STA has received a country information element including a white list or a black list, the STA performs scanning taking into consideration the white list or the black list of the country information element. That is, the STA scans channels included in a white list when the country information element includes the white list and scans channels other than channels of the TVWS included in a black list when the country information element includes the black list.

When the STA has transmitted, to the AP, an extended capabilities information element including a whitespace map service bit which is set to true, the AP may determine that the STA has requested a whitespace map and transmit the whitespace map to the STA using the country information element.

Although the first embodiment of the present invention has been described above with reference to an example in which a whitespace map service bit is added to the extended capabilities information element, the whitespace map service bit may be included in any information element or any frame.

Next, a whitespace map according to a second embodiment of the present invention is described below with reference to FIGS. 7 and 8.

The whitespace map suggested in the second embodiment of the present invention may selectively signal a white list or a black list. The whitespace map may also signal whether a white list or a black list is signaled.

The second embodiment of the present invention suggests a method in which availability of each TV channel is expressed as a bitmap. A whitespace map element may be defined and whether the whitespace map element includes a white list or a black list may be signaled through a specific field in the whitespace map element.

Figure 7:
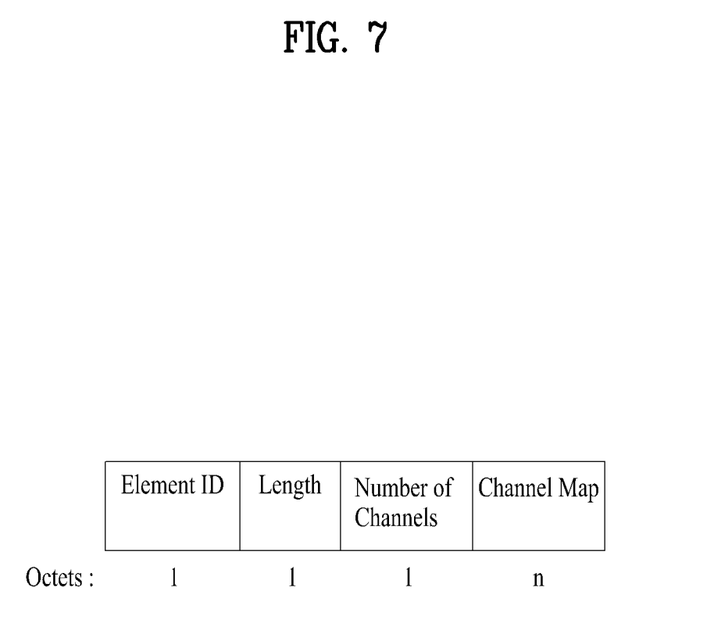
FIG. 7 illustrates a whitespace map element according to the second embodiment.

FIG. 7 illustrates a whitespace map element according to the second embodiment.

As shown in FIG. 7, the whitespace map element includes an Element ID field, a Length field, a Number of Channels field, and a Channel Map field.

The Element ID field indicates that the corresponding element is a whitespace map element and the Length field indicates the length of fields that follow the Length field. The Number of Channels field indicates the number of channels indicated by the Channel Map field.

The length of the whitespace map element is determined by the Channel Map field and the length of the Channel Map field varies according to the number of TV channels, availability of which is signaled by the Channel Map field. When the Channel Map field signals availability of TV channels in the TVWS, the length of the Channel Map field is determined by the total number of TV channels.

Figure 8:
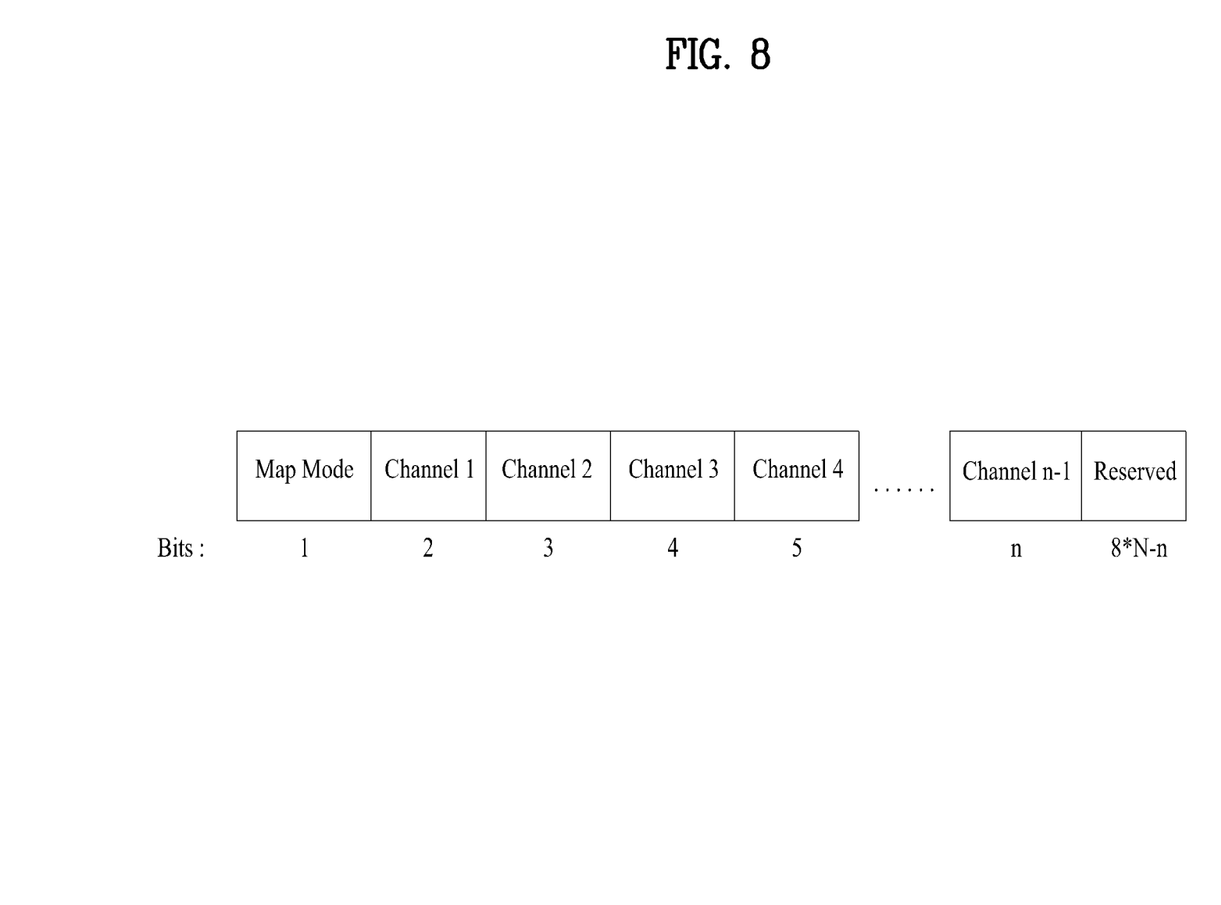
FIG. 8 illustrates a Channel Map field.

FIG. 8 illustrates the Channel Map field. As shown in FIG. 8, the Channel Map field includes a Map Mode field and a channel list.

The Map Mode field is a 1 bit field indicating whether the channel list included in the Channel Map field is a white list or a black list.

The channel list indicates a white list or a black list according to the value of the Map Mode field.

As shown in FIG. 8, the channel list may be expressed in bitmap form. That is, availability of each of a plurality of TV channels is indicated by allocating 1 bit to each of the plurality of TV channels. For example, a bit allocated to each TV channel which can be used by an unlicensed device since the channel is not used by a licensed device may be set to 1 and a bit allocated to each TV channel which cannot be used by an unlicensed device since the channel is being used by a licensed device may be set to 0.

The channel list may indicate channel numbers of channels which can be used by a licensed device or channel numbers of channels which cannot be used by a licensed device. When the channel list indicates channel numbers of channels which can be used by a licensed device, the channel list may include a maximum power level of each channel. When the STA has received a whitespace map including channel numbers of channels which can be used by a licensed device from the AP and has then detected a licensed device signal from among the available channels included in the received whitespace map, the STA may signal information, indicating whether or not a licensed device signal has been detected, in the form of a bitmap to the AP. The AP may then update the whitespace map taking into consideration information indicating whether or not a licensed device signal has been detected, which has been received from each STA. The AP then broadcasts the updated whitespace map to the entire BSS.

The AP and the STA which operate in the TVWS may connect to a TV channel database to check availability of each TV channel. The AP and the STA which operate in the TVWS need to be able to detect unregistered licensed device signals such as a TV signal and a microphone signal in addition to registered TV signals through spectrum sensing. The AP which operates as a master in the TVWS first transmits a whitespace map. When the STA has received the whitespace map and has then detected a licensed device signal in a channel, which has been signaled as an available channel, from the received whitespace map, the STA updates the received whitespace map through individual spectrum sensing of the whitespace map.

Methods of signaling the whitespace map include a method of transmitting a white list through a whitespace map element and a method of transmitting a black list through a whitespace map element as described above.

The AP may transmit the whitespace map element within a beacon frame, a probe response frame, a public action frame, or the like. When an STA receives the whitespace map from the AP, the STA may update the whitespace map according to a result of spectrum sensing performed by the STA and may then transmit the updated whitespace map. Methods of updating the whitespace map include a method of updating the white list and a method of updating the black list respectively for the method of transmitting the white list through the whitespace map element and the method of transmitting the black list through the whitespace map element.

The STA needs to update the whitespace map and then to transmit the updated whitespace map. Here, the STA may perform signaling of only channels indicated by the whitespace map received from the AP.

In the case in which the AP has signaled a white list through a whitespace map, the STA may signal channels, in which it has been confirmed that no licensed device signal is included through spectrum sensing, from among channels included in the received white list. This is referred to as a white list update scheme. Alternatively, the STA may signal channels, in which a licensed device signal has been detected through spectrum sensing, from among channels included in the white list received from the AP. This is referred to as a black list update scheme. That is, the STA transmits only a list of channels, which have been determined to be channels which cannot be used by an unlicensed device since a licensed device signal has been detected in the channels, from among channels included in the white list of the whitespace map received from the AP.

In the case in which the AP has signaled a black list through a whitespace map, the STA may signal channels, in which it has been confirmed that no licensed device signal is included through spectrum sensing, from among channels included in the received black list. This is referred to as a white list update scheme. Alternatively, the STA may signal channels, in which a licensed device signal has been detected through spectrum sensing, from among channels included in the received black list. This is referred to as a black list update scheme.

The above schemes are methods for reducing signaling overhead when the STA updates a whitespace map and signals the updated whitespace map. Here, the length of a channel map field of the updated whitespace map is limited by the number of channels included in the white list transmitted by the AP or the number of channels included in the black list.

Particularly, when the AP has signaled a white list, it is efficient for the STA to employ the method of signaling a list of channels in which a licensed device signal has been detected through spectrum sensing from among channels included in the received white list. When the AP has signaled a black list, it is efficient for the STA to employ the method of signaling a list of channels in which it has been confirmed through spectrum sensing that the channels are not used by a licensed device from among channels included in the received black list.

The AP needs to be able to selectively signal a white list or a black list for a previously transmitted whitespace map even when database information has been updated for the previously transmitted whitespace map.

In the case in which the AP has previously signaled a white list through a whitespace map, the AP may signal channels which have become channels which cannot be used by an unlicensed device due to change of database information from among channels included in the previously transmitted white list. This is referred to as a black list update scheme. Alternatively, the AP may signal channels which can still be used by an unlicensed device after the database information has changed from among the channels included in the previously transmitted white list. This is referred to as a white list update scheme.

In the case in which the AP has previously signaled a black list through a whitespace map, the AP may signal channels which have become channels which cannot be used by an unlicensed device due to change of database information from among channels included in the previously transmitted black list. This is referred to as a white list update scheme.

The AP or STA may request a whitespace map from the STA or AP. Upon receiving such a request, the STA or AP signals a whitespace map as a response to the request. When the STA requests a whitespace map, the STA may transmit information regarding a whitespace map updated by the STA to the AP. The AP may then reflect the updated whitespace map information received from the STA in a whitespace map and may then transmit the whitespace map to STAB in the BSS.

Figure 9:
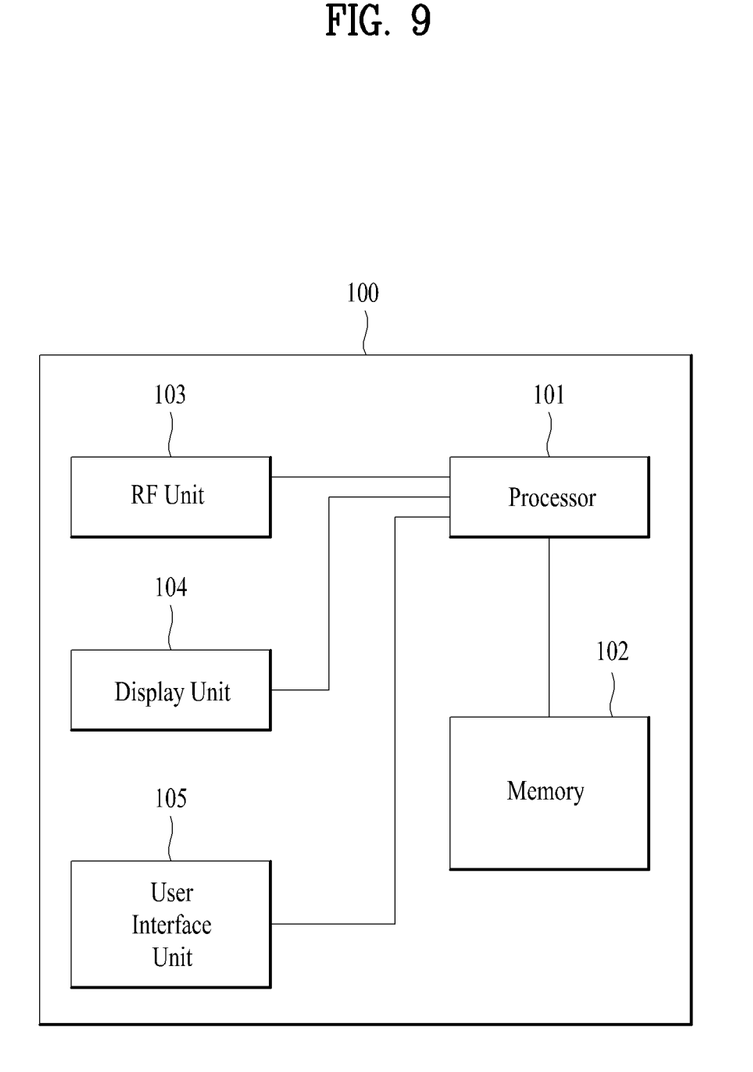
FIG. 9 is a block diagram illustrating a configuration of a device which can be applied to an STA or an AP and which can carry out the present invention.

FIG. 9 is a block diagram illustrating a configuration of a device which can be applied to an STA or an AP and which can carry out the present invention. As shown in FIG. 9, the device 100 includes a processor 101, a memory 102, a Radio Frequency (RF) unit 103, a display unit 104, and a user interface unit 105.

A physical interface protocol layer is implemented in the processor 101. The processor 101 provides a control plane and a user plane. Functions of each layer can be performed by the processor 101.

The memory 102 is electrically connected to the processor 101 and stores an operating system, applications, and general files.

When the device 600 is a user equipment, the display unit 104 may display various information and may be implemented using a known Liquid Crystal Display (LCD), a known Organic Light Emitting Diode (OLED), or the like. The user interface unit 105 may be coupled to a known user interface such as a keypad or a touchscreen.

The RF unit 103 is electrically connected to the processor 101 and transmits or receives a wireless signal. The RF unit 103 may include a transmission module and a reception module.

The transmission module may perform specific coding and modulation on a signal and/or data, which is scheduled to be transmitted to the outside by the processor 101, and then may deliver the signal and/or data to an antenna.

The reception module may perform decoding and demodulation on a wireless signal, which is received from the outside through an antenna, to reconstruct the wireless signal into original data and then may deliver the reconstructed data to the processor 101.

The reception module of the STA according to an embodiment of the present invention receives a whitespace map including a black list and a first field, which indicates that the whitespace map includes the black list, from the AP or enabling STA.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Although the various embodiments of the present invention have been described above mainly with reference to an IEEE 802.11 system, the present invention may be applied in the same manner to various mobile communication systems in which an unlicensed device can operate by acquiring available channel information.

The invention claimed is:

1. A method for receiving a whitespace map by a first station (STA) that operates as an unlicensed device that is allowed to operate in an available channel that is not being used by a licensed device in a whitespace band in a wireless LAN system, the method comprising:
   receiving a frame including a whitespace map including a black list and a first field indicating that the whitespace map includes the black list from a second station;
   operating in at least one channel, other than channels included in the black list, from among channels included in the whitespace map,
   transmitting information regarding an updated whitespace map to the second station,
   wherein the black list is a list of channels which cannot be used by an unlicensed device, and
   wherein the information regarding the updated whitespace map is a list of channels which have changed to be available to an unlicensed device among the channels included in the black list.

2. The method according to claim 1, further comprising wherein the updated whitespace map is acquired by:
   performing spectrum sensing; and
   updating the whitespace map according to a result of the spectrum sensing.

3. The method according to claim 1, wherein the black list is expressed in bitmap form.

4. The method according to claim 1, further comprising scanning channels other than the channels included in the black list from among the channels included in the whitespace map.

5. The method according to claim 1, wherein, when the frame includes a white list, the first field indicates maximum transmit powers of channels included in the white list the white list being a list of channels which can be used by an unlicensed device.

6. The method according to claim 5, wherein the first field indicates that the frame includes the black list when the first field is set to a predefined specific value.

7. The method according to claim 1, wherein the frame further includes a second field indicating that the frame includes the whitespace map.

8. The method according to claim 1, further comprising receiving an information element including a bit indicating that the frame includes the whitespace map from the second station.

9. The method according to claim 8, wherein the information element is an extended capabilities information element.

10. A first station (STA) that operates as an unlicensed device that is allowed to operate in an available channel that is not being used by a licensed device in a whitespace band in a wireless LAN system, the first station comprising:
   a reception module configured to receive a frame including a whitespace map including a black list and a first field indicating that the whitespace map includes the black list from a second station;
   a processor configured to operate in at least one channel, other than channels included in the black list, from among channels included in the whitespace map; and
   a transmission module configured to transmit information regarding an updated whitespace map to the second station,
   wherein the black list is a list of channels which cannot be used by an unlicensed device, and
   wherein the information regarding the updated whitespace map is a list of channels which have changed to be available to an unlicensed device among the channels included in the black list.

11. The first station according to claim 10, wherein:
   the processor is further configured to acquire the updated whitespace map by:
   performing spectrum sensing and
   updating the whitespace map according to a result of the spectrum sensing.

12. The first station according to claim 10, wherein the black list is expressed in bitmap form.

13. The first station according to claim 10, wherein the processor is further configured to scan channels other than the channels included in the black list from among the channels included in the whitespace map.

14. The first station according to claim 10, wherein, when the frame includes a white list, the first field indicates maximum transmit powers of channels included in the white list the white list being a list of channels which can be used by an unlicensed device.

15. The first station according to claim 14, wherein the first field indicates that the frame includes the black list when the first field is set to a predefined specific value.

16. The first station according to claim 10, wherein the frame further includes a second field indicating that the frame includes the whitespace map.

17. The first station according to claim 10, wherein the reception module receives an information element including a bit indicating that the frame includes the whitespace map from the second station.

18. The first station according to claim 17, wherein the information element is an extended capabilities information element.

* * * * *